United States Patent [19]

Uno

[11] Patent Number: 5,371,724
[45] Date of Patent: Dec. 6, 1994

[54] DATA TRANSDUCER POSITIONING SYSTEM WITH AN OVERRUN PREVENTION CAPABILITY

[75] Inventor: Hisatoshi Uno, Tokyo, Japan

[73] Assignee: Teac Corporation, Tokyo, Japan

[21] Appl. No.: 226,417

[22] Filed: Apr. 12, 1994

Related U.S. Application Data

[63] Continuation of Ser. No. 77,818, Jun. 16, 1993, abandoned, which is a continuation of Ser. No. 550,873, Jun. 21, 1990, abandoned.

[30] Foreign Application Priority Data

Jul. 7, 1989 [JP] Japan .................................. 1-176939

[51] Int. Cl.$^5$ .............................................. G11B 7/00
[52] U.S. Cl. .................................. 369/32; 360/78.11; 360/78.04
[58] Field of Search .............................. 369/32, 44.28; 360/78.14, 78.04, 78.13, 77.08, 77.11, 78.11

[56] References Cited

U.S. PATENT DOCUMENTS

| | | | |
|---|---|---|---|
| 4,390,912 | 6/1983 | Hertrich et al. | 360/78.14 |
| 4,472,750 | 9/1984 | Klumpp et al. | 360/78.13 |
| 4,920,462 | 4/1990 | Couse et al. | 360/78.14 |
| 5,060,093 | 10/1991 | Kawahara | 369/32 |
| 5,079,654 | 1/1992 | Uno et al. | 360/78.14 |
| 5,126,895 | 6/1992 | Yasuda et al. | 360/77.08 |
| 5,128,812 | 7/1992 | Uno | 360/78.04 |

Primary Examiner—Robert J. Pascal
Assistant Examiner—Tan Dinh
Attorney, Agent, or Firm—Woodcock Washburn Kurtz Mackiewicz & Norris

[57] ABSTRACT

A data storage and retrieval system is disclosed which includes a transducer for data transfer with a rotating magnetic disk having a multiplicity of addressable annular data tracks formed concentrically on at least one of the major surfaces thereof. The transducer reads the prerecorded addresses on the successive data tracks being traversed during each track seeking operation. Periodically sampling the track addresses being read by the transducer, a microprocessor determines the data track on which the transducer is currently positioned, and computes the remaining number of tracks to be traversed until the transducer arrives at a destination track. Should there be errors in the track address samples, due for example to the failure of the transducer to read some track addresses, the microprocessor might become unable to determine the correct current transducer position, with the consequent possibility of transducer overrun beyond the data storage zone on the disk surface. The seek operation is therefore discontinued immediately when a prescribed number of errors are found in the track address samples and in sector pulses that determine the sampling intervals. Additional embodiments are disclosed in which track seeking operation is stopped when the transducer has just overrun the data storage zone.

11 Claims, 10 Drawing Sheets

DATA TRANSDUCER POSITIONING SYSTEM WITH AN OVERRUN PREVENTION CAPABILITY

This is a continuation of application Ser. No. 08/077,818, filed Jun. 16, 1993 and now abandoned, which is a continuation of Ser. No. 07/550,823, filed Jun. 21, 1990 now abandoned.

BACKGROUND OF THE INVENTION

My invention relates generally to an apparatus for the transfer (reading and/or writing) of data with disklike record media such as magnetic disks notably including those of the "fixed" or hard disk variety. More particularly, my invention pertains to a system in such an apparatus for controlling the position of the transducer or head with respect to a multiplicity of concentric annular data tracks on the surface of a disklike record medium. The transducer positioning system of my invention particularly features provisions for preventing the transducer from excessive overrun beyond the boundaries of the data storage zone comprised of the tracks on the disk surface.

A variety of schemes have been suggested and used for positioning a transducer with respect to the data tracks on a hard magnetic disk. Typical of such known schemes are: (1) a servo system with a servo head and a replicated servo surface on the disk; (2) another servo system employing an encoder for the detection of the positional relationship between the transducer and the data tracks; (3) still another servo system wherein the transducer reads addresses prerecorded on individual tracks during track seeking; and (4) an open-loop system with a stepper motor for moving the transducer a distance specified by the number of stepping pulses.

The closed-loop servo systems are generally preferred for the accuracy and quickness with which the transducer can be positioned on any selected track. In such servo positioning of the transducer, the track on which the transducer is currently position must be known at every moment during the progress of track seeking, in order that the transducer may be moved the exact distance between the current and destination tracks. However, should the transducer be moved too fast across the data tracks, the exact detection of the current transducer position would become impossible. The transducer might then overrun the data storage zone and ride onto either of the two guard bands disposed radially inwardly and outwardly of the data storage zone on the disk surface.

Usually, the known transducer positioning mechanisms include mechanical limit stops for preventing the transducer from excessive overrun beyond the boundaries of the data storage zone. Such limit stops represent no truly satisfactory solution to the problem of how to avoid excessive transducer overrun. For, if a very substantial error takes place in the positional control of the transducer during track seeking in the prior art devices, the transducer carrier means has been prone to violently hit either of the limit stops, possibly resulting in the impairment of the transducer or the disk.

SUMMARY OF THE INVENTION

I have hereby invented how to effectively prevent, in a rotating disk data storage apparatus of the kind defined, transducer overrun without the danger of destruction of the transducer, the disk or any other associated parts of the apparatus.

Briefly, my invention may be summarized as a transducer position control system in a data storage apparatus of the type including a transducer for data transfer with a rotating data storage disk having an annular data storage zone comprised of a multiplicity of concentric data tracks on at least one of the opposite major surfaces of the disk, and a read circuit for providing an output representative of data read from the data storage disk by the transducer. The transducer position control system comprises positioning means connected to the transducer for moving the transducer across the data tracks on the data storage disk and for positioning the transducer over any selected one of the data tracks, control circuit means connected to the positioning means for controlling the movement of the transducer with respect to the data storage disk, and overrun detector circuit means connected to the read circuit for ascertaining, on the basis of the output from the read circuit, whether the transducer is about to overrun, or has overrun, the data storage zone on the data storage disk during track seeking operation. The overrun detector circuit means is also connected to the control circuit means for causing the control circuit means to discontinue the track seeking operation when the transducer is found to be about to overrun, or to have overrun, the data storage zone.

Typically, the transducer position control system of my invention lends itself to use with the data storage disk having track addresses prerecorded on the individual data tracks. The transducer reads the track addresses on the successive data tracks being traversed during each track seeking operation. In this particular application the transducer position control system includes sampling means connected to the read circuit for sampling at regular intervals the track addresses being read by the transducer. The control circuit means controls the movement of the transducer with respect to the data storage disk on the basis of the track address samples obtained. The overrun detector circuit means is connected between the sampling means and the control circuit means for detecting errors in the track address samples being sent to the control circuit means. The track seeking operation is discontinued when a prescribed number of errors are found.

It will have been noted that in the above described application of my invention, the track seeking operation is discontinued when the transducer is still on the data storage zone but is very likely to overrun the data storage zone because of errors in the track address samples. Alternatively, the track seeking operation may be stopped immediately when the transducer has overrun the data storage zone. In either case, the collision of the transducer carrier means with the limit stops can be avoided.

My invention particularly features the fact that transducer overrun, either actual or imminent, can be detected from the output from the read circuit. No sensors or the like are required, but only the electronic hardware of the existing rotating disk data storage system may be slightly modified as taught herein. Mechanically, therefore, the construction of the data transfer apparatus incorporating the principles of my invention is just as simple as heretofore.

The above and other features and advantages of my invention and the manner of realizing them will become more apparent, and the invention itself will best be understood, from a study of the following description and appended claims, with reference had to the attached drawings showing some preferable embodiments of my invention.

DESCRIPTION OF THE PREFERRED EMBODIMENTS

I will now describe my invention in detail as embodied in a hard disk data storage and retrieval system of the type disclosed in U.S. patent application Ser. No. 358,970 filed May 30, 1989, by Uno et al. under the title of "Data Transducer Position Control System for Data Transfer Apparatus Employing Disklike Record Media." The matter disclosed in that prior application will be incorporated herein to an extent necessary for a full understanding of my present invention.

Figure 1:
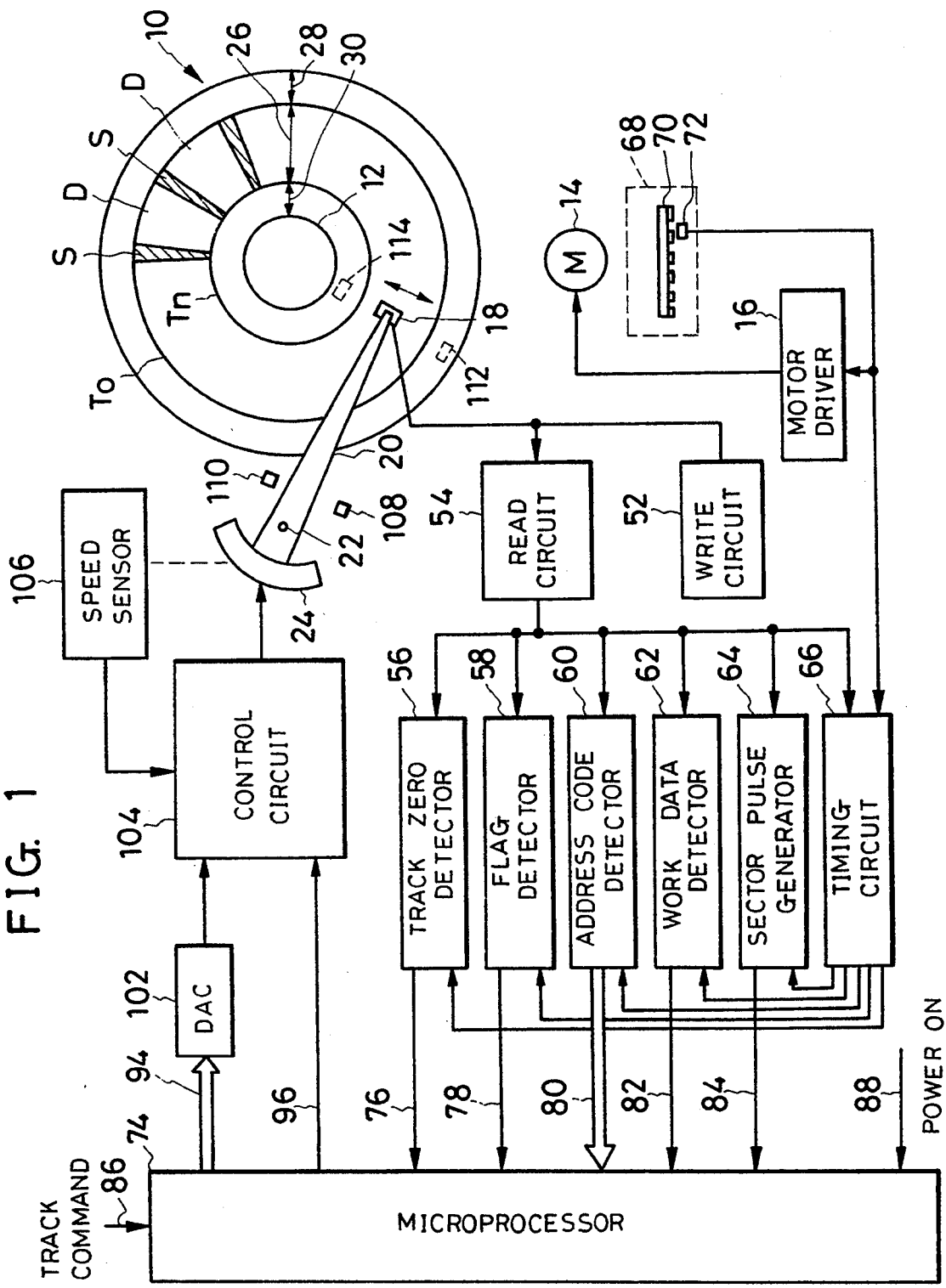
FIG. 1 is a block diagram of a hard magnetic disk data storage and retrieval system incorporating the transducer positioning system of my invention.

Shown at 10 in FIG. 1 is a hard magnetic disk mounted fast on a drive spindle 12, although in practice two or more such disks might be employed for joint rotation with the drive spindle. An electric disk drive motor 14 is coupled directly to the drive spindle 12. A motor driver circuit 16 is electrically connected to the disk drive motor 14 for causing the same to drive the disk 10 at prescribed operating speed.

Let us assume for the simplicity of illustration that the magnetic disk 10 is single sided. Thus, in FIG. 1, I have shown only one electromagnetic data transducer or head 18 conventionally gimbaled on one end of a transducer carrier beam 20 of resilient material. The transducer 18 is intended for data transfer with the single data storage surface of the disk 10 on which there are formed a multiplicity of concentric annular data tracks to be detailed subsequently. Medially pivoted at 22, the transducer carrier beam 20 is coupled at the other end thereof to a seek motor herein shown as a voice coil motor 24. The voice coil motor 24 can be of conventional make comprising a permanent magnet and a coil, both not shown because of their well known nature. The controlled energization of the unshown coil results in the bidirectional angular translation of the transducer carrier beam 20 in a plane parallel to the plane of the disk 10 and, in consequence, of the travel of the transducer 18 back and forth across the data tracks on the disk surface.

Although the disk 10 has a multiplicity of data tracks as aforesaid, I have shown in FIG. 1 only the radially outmost track $T_0$ and radially inmost track $T_n$ for simplicity. Actually, of course, there are many other unshown tracks between these tracks $T_0$ and $T_n$. All these tracks $T_0$–$T_n$ constitute in combination a data storage zone 26. An outer guard band 28 and an inner guard band 30 are disposed radially outwardly and inwardly, respectively, of the data storage zone 26.

I assume in this particular embodiment that the data storage surface of the disk 10 is divided into sixteen data sectors D and as many servo sectors S which are interleaved. Again, however, I have indicated only three of the servo sectors S by the hatching for illustrative convenience.

Figure 2:
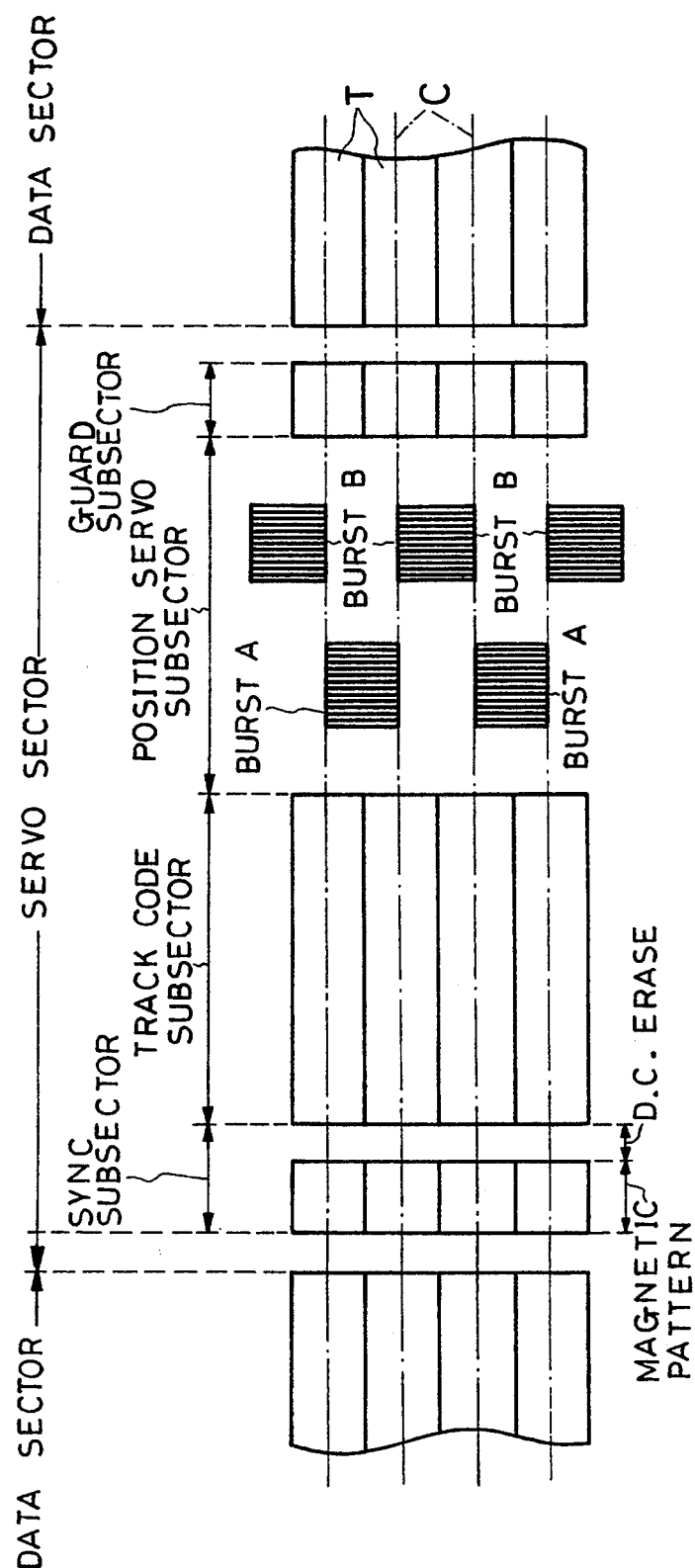
FIG. 2 shows, in developed, fragmentary form, one of the servo sectors on the magnetic disk used in the FIG. 1 system.

As schematically indicated in FIG. 2, each servo sector S of the disk 1 resolves itself into a sync subsector, a track address code subsector, a position servo subsector and a guard subsector. The sync subsector contains a zone for recording magnetic patterns and a d.c. erase zone for synchronization purposes. The position servo subsector has recorded thereon servo bursts A and B for holding the transducer 18 in alignment with the centerline C of each selected track T.

Figure 3:
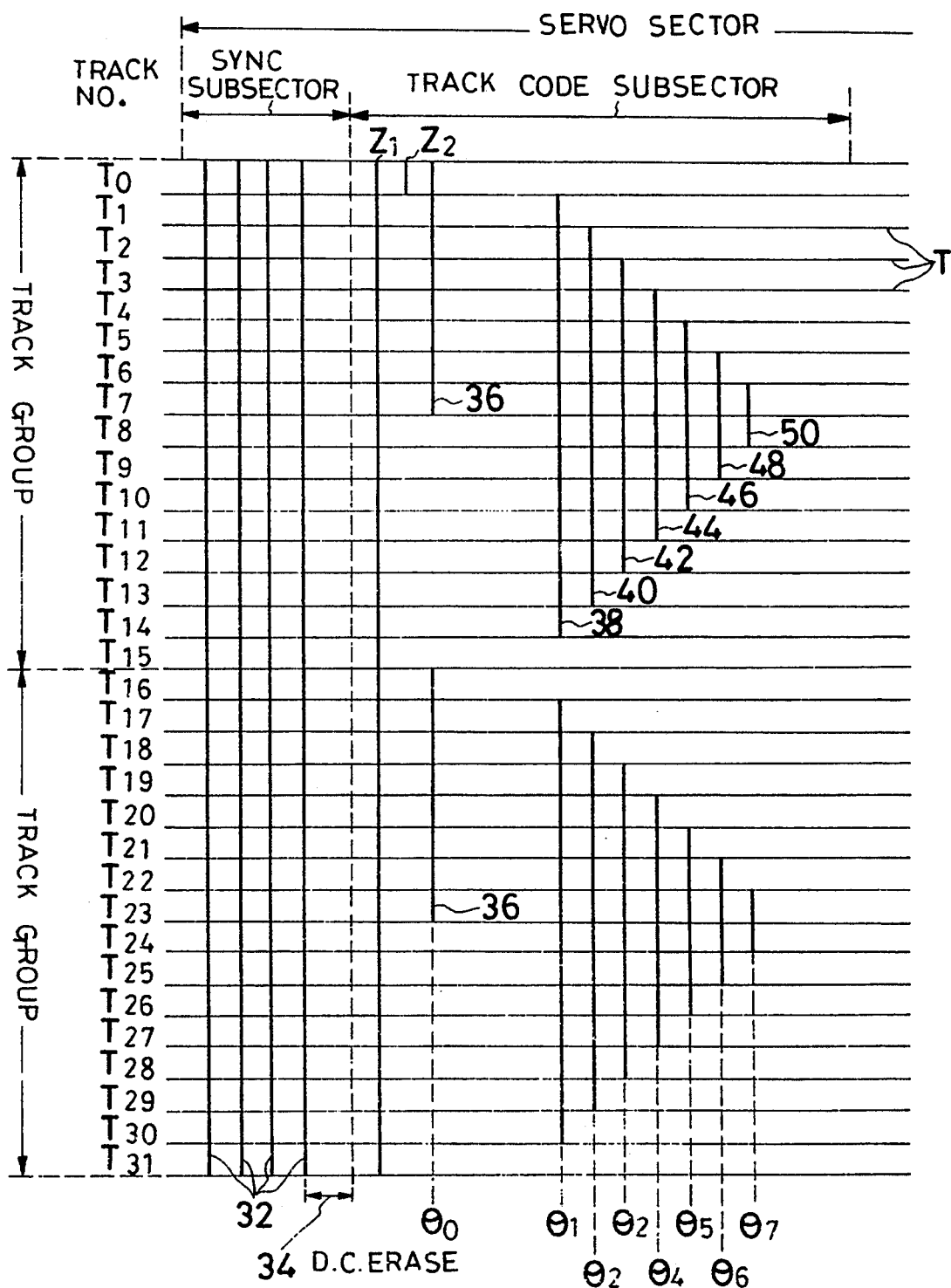
FIG. 3 is a more detailed illustration of part of the servo sector of FIG. 2, including the track address code subsector on which track address code is prerecorded.

FIG. 3 is a more detailed, partial illustration of the sync subsector and track address code subsector of each servo sector of the disk 1. The sync subsector has four discrete magnetized regions 32 and one d.c. erase zone 34. The track address code subsector stores the track address code characters assigned to the individual tracks T for their identification. The elements making up each such code character are the presence or absence of discretely magnetized regions in specific angular positions on the disk.

As has been proposed by Uno et al. application mentioned above, all the tracks T on the disk surface are divided into a plurality of groups each consisting of, say, sixteen tracks. The same set of code characters are assigned to each group of tracks as their addresses. Thus, as depicted in FIG. 3, the first group of sixteen tracks, consisting of Track $T_0$ to Track $T_{15}$, have the same set of address code characters as the second group of sixteen tracks consisting of Track $T_{16}$ to Track $T_{31}$. It is understood that all the other track groups, not shown here, have the same set of address code characters assigned to their constituent tracks.

Further, for greater simplicity of the track code characters, each group of tracks are subdivided into two subgroups comprising the same number of tracks. Tracks $T_0$ to $T_7$ of the first group make up the first subgroup, and Tracks $T_8$ to $T_{15}$ the second subgroup. Likewise, Tracks $T_{16}$ to $T_{23}$ of the second group make up the first subgroup, and Tracks $T_{24}$ to $T_{31}$ the second subgroup. All the other unshown track groups are similarly subdivided.

I will now explain the set of code characters assigned to Tracks $T_0$ to $T_{15}$ of the first group by way of example, it being understood that the same explanation applies to each of all the other groups of tracks on the disk surface. First of all, the first subgroup $T_0$ to $T_7$ of the first group of tracks has magnetized regions 36 whereas the second subgroup $T_8$ to $T_{15}$ has not. All situated in the same circumferential position $\Theta_0$ on the disk surface, the magnetized regions 36 serve to provide a flag for distinguishing the two subgroups from each other.

Tracks $T_0$ and $T_{15}$ have no magnetized region for their individual identification but can be distinguished from each other as only track $T_0$ has the magnetized region 36. Tracks $T_1$ to $T_{14}$ in between have first to seventh magnetized regions 38, 40, 42, 44, 46, 48 and 50 for distinction from each other and from the other two tracks $T_0$ and $T_{15}$ of the first group. The following is a more detailed study of the magnetized regions 38-50 recorded on Tracks $T_1$ to $T_{14}$ as their addresses.

Tracks $T_1$ and $T_{14}$ have only the first magnetized region 38 in the first angular position $\Theta_1$. Tracks $T_2$ and $T_{13}$ have both the second magnetized region 40 in the second angular position $\Theta_2$, in addition to the first magnetized region 38. Tracks $T_3$ and $T_{12}$ have both the third magnetized region 42 in the third angular position $\Theta_3$, in addition to the first and second magnetized regions 38 and 40. Tracks $T_4$ and $T_{11}$ have both the fourth magnetized region 44 in the fourth angular position $\Theta_4$, in addition to the first to third magnetized regions 38-42. Tracks $T_5$ and $T_{10}$ have both the fifth magnetized region 46 in the fifth angular position $\Theta_5$, in addition to the first to fourth magnetized regions 38-44. Tracks $T_6$ and $T_9$ have both the sixth magnetized region 48 in the sixth angular position $\Theta_6$, in addition to the first to fifth magnetized regions 38-46. Tracks $T_7$ and $T_8$ have both the seventh magnetized region 50 in the seventh angular position $\Theta_7$, in addition to the first to sixth angular positions 38-48.

It is now apparent that Tracks $T_0$ to $T_{15}$ of the first group are individually identifiable by the above explained arrangement of the magnetized regions 36-50. The tracks of each of the other groups are likewise identifiable since the arrangement of the magnetized regions 36-50 is the same in each such group.

The track code subsector additionally contains magnetized regions $Z_1$ and $Z_2$ for the detection of Track $T_0$ (outmost track). Track $T_0$ contains both magnetized regions $Z_1$ and $Z_2$. All the other tracks contain only the magnetized region $Z_1$. Alternatively, not only Track $T_0$ but also Tracks $T_1$ and $T_2$ may contain magnetized regions $Z_2$. Track $T_0$ will nevertheless be detected from the combinations of the magnetized regions $Z_2$ and 36-50.

Contrary to the showing of FIG. 3, the magnetized regions 32-50 may not be joined to one another across the track boundaries but may be formed discontinuously within the bounds of the respective tracks. Such discontinuous magnetized regions will result of necessity if they are created by the transducer 18.

Referring back to FIG. 1, I will proceed to the description of the electronic hardware of the data storage and retrieval system illustrated therein, with an emphasis on the servo positioning of the transducer 18 with respect to the addressable data tracks T on the magnetic disk 10. In the course of such hardware description I will refer also to the waveform and timing diagram of FIG. 4, which shows the signals appearing in the various parts of the FIG. 1 system.

The transducer 18 is electrically connected to both a write circuit 52 and a read circuit 54. The write circuit 52 is intended for the supply of a write current to the transducer 18 during system operation in the write mode. The write current represents the data to be written on the frequency modulation, or modified frequency modulation, scheme.

Figure 4:
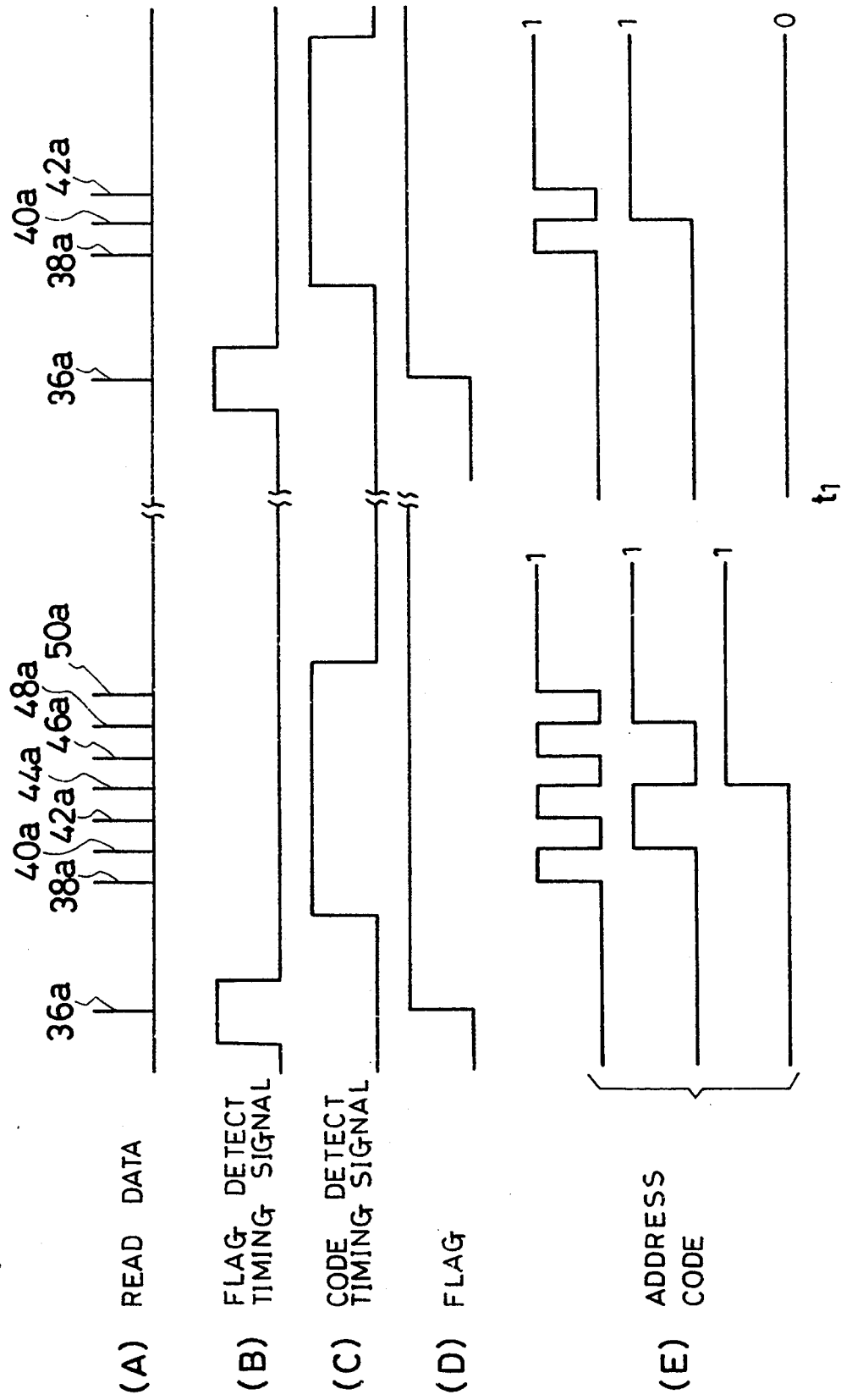
FIG. 4, consisting of (A)–(E), is a series of waveform and timing diagrams useful in explaining the operation of the FIG. 1 system.

The read circuit 54, on the other hand, functions to amplify and otherwise process the transducer output into read data in the form of a pulse signal representative of the servo and work data retrieved from the disk 10. FIG. 4 indicates at (A) the read circuit output pulses $63a$-$50a$ representative of the magnetized regions 36-50, FIG. 3, constituting the elements of the track address code. The read circuit 54 has its output connected to all of a track zero detector circuit 56, a flag detector circuit 58, an address code detector circuit 60, a work data detector circuit 62, a sector pulse generator 64, and a timing circuit 66.

The timing circuit 66 generates various timing signals based on sync pulses contained in the read data put out by the read circuit 54. Such timing signals are sent to the track zero detector circuit 56, flag detector circuit 58, address code detector circuit 60, work data detector circuit 62 and sector pulse generator 64 in order to control their operations in timed relation to one another.

Connected to an additional input of the timing circuit 66 is what is known to the specialists as a frequency generator 68 for the detection of the speed of rotation of the disk 10 as well as the positions of the servo sectors S thereon. The timing circuit 66 is itself timed by the frequency generator 68 for deriving the sync pulses from the read data produced by the read circuit 54.

The frequency generator 68 comprises a rotary disk 70 and an electromagnetic sensor 72. The rotary disk 70 has an annular series of alternating N and S poles disposed thereon in an arrangement corresponding to that of the servo sectors S on the disk 10. The sensor 72 puts out a series of electric pulses as the rotary disk 70 rotates with the disk drive motor 14. The standard practice in the disk drive art is to write the servo data on the servo sectors S of the disk 10 in synchronism with the output pulses of the frequency generator 68. Therefore, as a natural result, the output pulses of the frequency generator 68 may be relied upon as a timing signal for the determination of the servo sectors S.

It will also be noted from FIG. 1 that the frequency generator 68 has its output additionally connected to the disk drive motor driver circuit 16. I have stated that the disk 10 has sixteen servo sectors S. This statement necessarily implies that the frequency generator 68 puts out sixteen pulses with each disk revolution. The recurrence rate of these pulses is proportional to the speed of disk rotation. The motor driver circuit 16 utilizes the pulse signal for the constant speed driving of the disk drive motor 14.

The track zero detector circuit 56 derives, under the control of the tinting circuit 66, a TRACK ZERO signal from the read circuit output pulse representative of the magnetized region $Z_2$, FIG. 3, on Track $T_0$. The TRACK ZERO signal, indicative of whether the transducer 18 is positioned on Track $T_0$ or not, is sent to a digital system controller microprocessor 74 over a line 76.

The flag detector circuit 58 goes high in response to the read circuit output pulses of FIG. 4(A) only during the high state of a FLAG DETECT TIMING signal, FIG. 4(B), fed from the timing circuit 66. Thus, in response to the comparator output pulses 36a representative of the magnetized regions 36 on the track address code subsectors of the disk 10, the flag detector circuit 58 generates the flags of FIG. 4(D), for delivery to the microprocessor 74 over a line 78. The flag detector circuit 58 could therefore be termed a track subgroup discriminating circuit as its output serves to discriminate between the two subgroups of each track group.

The address code detector circuit 60 can take the form of a counter in practice. The counter may respond to the read circuit output pulses of FIG. 4(A) only during the high state of a CODE DETECT TIMING signal, FIG. 4(E), fed from the timing circuit 66. Therefore, the counter will count only the read circuit output pulses 38a–50a representative of the magnetized regions 38–40, FIG. 3, on the address code subsectors of the disk. FIG. 4(E) shows the resulting three-bit output from the address code detector circuit 60. This output is fed over a bus 80 to the microprocessor 74. Combined with the output from the flag detector circuit 58, the output from the address code detector circuit 60 enables the microprocessor 27 to individually identify the tracks of each group.

The timing circuit 66 delivers reset signals to both flag detector circuit 58 and address code detector circuit 60 in response to the read circuit output pulses representative of the magnetized regions 32 on the sync subsectors of the disk. Consequently, the address code detector circuit 60 restarts counting the read circuit output pulses representative of the magnetized regions 38–50 for each servo sector of the disk.

As indicated in FIG. 4, seven comparator output pulses 38a–50a representative of the seven magnetized regions 38–50 on one address code subsector have been input to the address code detector circuit 60 before time $t_1$. The resulting output from the circuit 60 is a binary [111]. Three comparator output pulses 38a–42a representative of the three magnetized regions 38–42 are input to the circuit 60 after the time $t_1$. The resulting output from the circuit 60 is [011].

The reader's attention is now invited to the first subgroup of tracks $T_0$–$T_7$ in FIG. 3. It will be understood from the foregoing description that the output from the address code detector circuit 60 is [000], [001], [010], [011], [100], [101], [110] and [111] when the transducer reads the address code characters assigned to Tracks $T_0$–$T_7$. Thus the microprocessor 74 can individually identify Tracks $T_0$–$T_7$ on the basis of the three-bit output from the address code detector circuit 60.

Generally, three-bit binary numbers have been used for individually identifying eight tracks. The illustrated embodiment employs, instead, a minimum of seven magnetized regions 38–50 for individually coding every eight tracks. The number of the magnetized regions 38–50 progressively increases and progressively decreases in each group of tracks, so that no significant errors will take place as the address code detector circuit 60 counts the read circuit output pulses representative of the magnetized regions.

The work data detector circuit 62 derives the work data, recorded on the data sectors D of the disk 1, from output from the read circuit 54 under the control of the timing circuit 66. The work data is also sent to the microprocessor 74 over a line 82.

The sector pulse generator 64 generates SECTOR PULSES indicative of the servo sectors S on the disk 10. Each SECTOR PULSE is generated and sent to the microprocessor 74 over a line 84 when the following three conditions are all met by the output from the read circuit 54:

1. A predetermined time spacing exists from the end of one data sector D to the beginning of the synchronization zone (FIG. 2) of the next servo sector S.

2. The d.c. erase zone 34, FIG. 3, of the servo sector S is present.

3. The magnetized region $Z_1$, FIG. 3, of the servo sector S is present.

Possibly, the foregoing three conditions may not be met periodically as the transducer fails to read all the necessary information on the disk. The sector pulse generator 64 will then fail to produce the SECTOR PULSES at regular intervals. In consideration of this possibility, a timer may be provided for inserting additional pulses in place of the missing SECTOR PULSES.

The microprocessor 74 has additional inputs connected to a TRACK COMMAND line 86 and a "POWER ON" line 88. The TRACK COMMAND signal sent over the line 86 indicates any of the data tracks T on the disk 10 on which the transducer 18 is to be positioned. The "POWER ON" signal over the line 88 indicates the fact that the complete system is electrically powered on.

Figure 5:
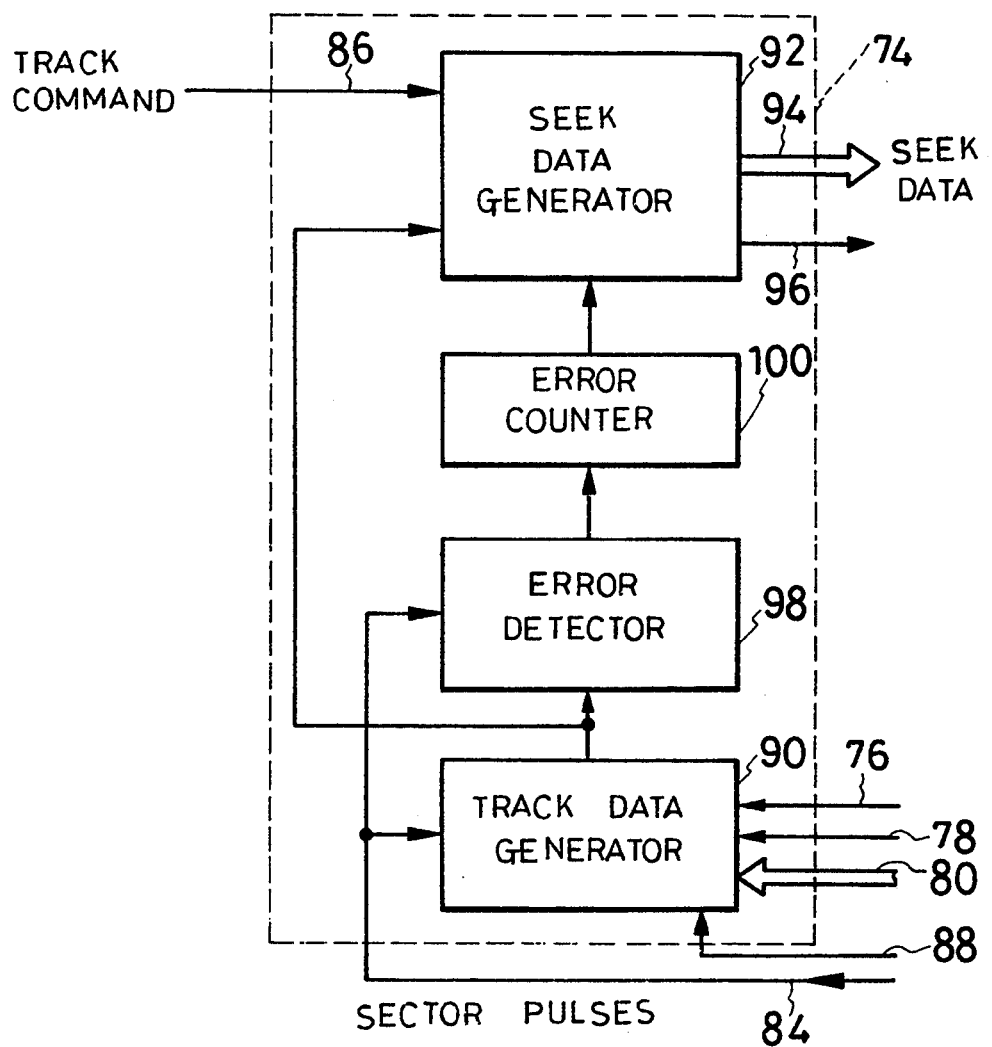
FIG. 5 is a block diagram showing those functional features of the microprocessor of the FIG. 1 system which are concerned with the transducer positioning system of my invention.

I have illustrated in FIG. 5 the circuit configuration of the microprocessor 74 insofar as is concerned with my invention. Generally, the microprocessor comprises a central processor unit, a random access memory and a read only memory. The read only memory is factory preprogrammed to cause the microprocessor operation that is depicted in FIG. 5 and which is described hereafter.

The microprocessor 74 includes a track data generator 90 to which there are connected the output line 76 of the track zero detector circuit 56, the output line 78 of the flag detector circuit 58, the output bus 80 of the address code detector circuit 60, the output line 84 of the sector pulse generator 64, and the "POWER ON" line 88. The track data generator 90 takes in the track address code from the address code detector circuit 60 in response to each SECTOR PULSE from the sector pulse generator 64 and delivers to a seek data generator 92 the TRACK DATA representative of the data track on which the transducer is currently positioned.

The seek data generator 92 provides SEEK DATA representative of the optimum speed at which the transducer may be moved by the voice coil motor 24, FIG. 1, for making zero the difference between the current track and the destination track. The current track is indicated as aforesaid by the TRACK DATA from the track data generator 90. The destination track is indicated by the TRACK COMMAND sent over the line 86.

Figure 6:
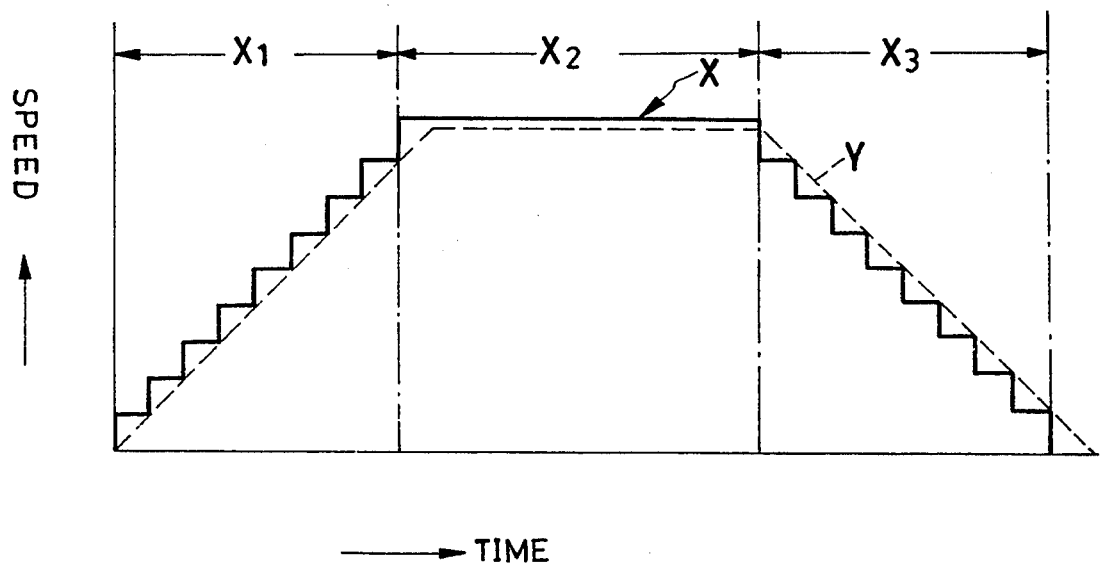
FIG. 6 is a graphic representation of the seek speed data for controlling the traveling speed of the transducer from departure track to destination track in the FIG. 1 system.

I have graphically illustrated in FIG. 6 how the transducer speed is controlled by the SEEK DATA from departure track to destination track. The solid-line SEEK SPEED CONTROL curve X comprises a linear acceleration period $X_1$ during which the transducer is accelerated linearly from zero, a constant speed period $X_2$ in which the transducer speed levels off at a predetermined constant speed, and a linear deceleration period $X_3$ in which the transducer is decelerated linearly from the constant speed back to zero. The linear acceleration period $X_1$, constant speed period $X_2$ and linear deceleration period $X_3$ of the SEEK SPEED CONTROL curve X are subject to change depending upon the particular distance from departure track to destination track of each track seek operation. Actually, the SEEK SPEED CONTROL curve X may consist essentially of only the acceleration period $X_1$ and the deceleration period $X_3$ in cases where the distance between departure track and destination track is short. The actual traveling speed of the transducer will closely approximate the SEEK SPEED CONTROL curve X, as indicated by the dashed curve Y in the same graph.

With reference back to FIG. 6 the seek data generator 92 puts out the SEEK DATA over bus 94. Also, the seek data generator 92 puts out a SEEK DIRECTION signal, indicative of the radially inward or outward direction in which the transducer is to be moved, over a line 96.

It will also be noted from FIG. 5 that the track data generator 90 has its output connected not only to the seek data generator 92 but also to an error detector circuit 98, to which are also input the SECTOR PULSES from the sector pulse generator 64. The error detector circuit 98 determines the presence or absence of errors in the TRACK DATA and the SECTOR PULSES during each interval between the servo sectors S on the disk 10. The error detector circuit 98 puts out an error pulse each time it finds an error in the TRACK DATA or in the SECTOR PULSES. I will later elaborate on this subject.

The error detector circuit 98 has its output connected to an error counter 100. As the name implies, the error counter 100 counts the error pulses from the error detector circuit 98. When the error pulses reach a predetermined number (e.g. three) during each track seek operation, the error counter 100 commands the seek data generator 92 to discontinue the track seeking.

A reference back to FIG. 1 will reveal that both SEEK DATA bus 94 and SEEK DIRECTION line 96 connect the microprocessor 74 to a digital to analog converter (DAC) 102, which in turn is connected to a motor control circuit 104 for the voice coil motor 24. The DAC 102 translates the SEEK DATA into an analog signal required by the motor control circuit 104.

Also connected to the motor control circuit 104 is a transducer speed sensor 106 for generating a voltage signal (TRANSDUCER SPEED signal) indicative of the traveling speed, as well as the traveling direction, of the transducer 18 with respect to the disk 10. The speed sensor 106 may comprise a coil, not shown, mounted to the transducer carrier beam 20 for movement therewith through a suitable magnetic field. The motor control circuit 104 compares the TRANSDUCER SPEED signal with the analog equivalent of the SEEK DATA and causes controlled energization of the voice coil motor 24 so that the transducer 18 may travel from departure track to destination track along the SEEK SPEED CONTROL curve X of FIG. 6.

Preferably, and as shown in FIG. 1, a pair of limit stops 108 and 110 may be provided for limiting the angular movement of the transducer carrier beam 20. The transducer 18 is thus permitted to travel only between a radially outmost position 112 on the outer guard band 28 of the disk 10 and a radially inmost position 114 on the inner guard band 30 of the disk.

As has been set forth with reference to FIG. 3, all the data tracks T on the surface of the disk 10 are addressed by assigning the same set of address code characters to each group of sixteen tracks. Further, each track group is subdivided into two subgroups which are distinguished from each other by the presence or absence of the magnetized region 36. The microprocessor 74 may be programmed as follows for discriminating between the two subgroups of each track group and for individually identifying all the sixteen tracks of each group.

As depicted in FIG. 4(D), the flag generated by the flag detector circuit 58 may be binary "1" or "0" depending upon whether the transducer encounters one of the magnetized regions 36. The microprocessor 74 directly uses the three-bit output of FIG. 4(E) from the address code detector circuit 60 as the track address code data for track identification when the flag is binary "1", that is, when the transducer is positioned on any of, for example, first subgroup of tracks $T_0$–$T_7$ of the first group of tracks $T_0$–$T_{15}$.

When the flag is binary "0" in the absence of any magnetized region 11, on the other hand, the microprocessor 74 subtracts the address code detector circuit output value from fifteen in terms of the decimal a system. Thus the microprocessor 74 performs the following arithmetic operations for, for example, the second subgroup $T_8$–$T_{15}$ of the first group of tracks: $(15-7=8)$ for Track $T_8$; $(15-6=9)$ for Track $T_9$; $(15-5=10)$ for Track $T_{10}$; $(15-4=11)$ for Track $T_{11}$; $(15-3=12)$ for Track $T_{12}$; $(15-2=13)$ for Track $T_{13}$; $(15-1=14)$ for Track $T_{14}$; and $(15-0=15)$ for Track $T_{15}$. The decimal equivalents of the track address code characters thus obtained for all the tracks of each group will be collectively referred to as the CONVERTED TRACK CODE. Actually, however, the microprocessor 74 makes these computations in the binary system.

It is clear from the foregoing how the microprocessor 74 is enabled to individually identify the sixteen tracks $T_0$–$T_{15}$ of the first group as well as the sixteen tracks of each of all the other groups on the surface of the disk 10. It should be appreciated that only eight different code elements, in the form of the discretely magnetized regions 36–50, are used for individually coding the 16 tracks and, in fact, all the tracks on the disk surface. I will later explain how the microprocessor 74 ascertains the travel of the transducer 18 from one track group to the next.

Operation

As is standard with the disk drive art, each track seeking operation of the transducer 18 starts at the outmost track $T_0$. The transducer must therefore be first positioned on Track $T_0$ as the disk 10 starts rotation upon closure of the system power switch, not shown, or in response to a calibration command from the unshown host computer. The following is a more detailed explanation of the procedure for automatically initializing the transducer 18 on Track $T_0$ upon closure of the power switch.

In response to the "POWER ON" signal sent over the line 88, the microprocessor 74 will command the motor control circuit 104 to move the transducer 18 radially outwardly of the disk 10. The motor control circuit 104 will cause the voice coil motor 27 to move the transducer 18 radially outwardly of the disk 10 at such low speed that the transducer can read the track address code prerecorded on the disk. The track zero detector circuit 56 on detection of the magnetized region $Z_1$ on Track $T_0$ will send the TRACK ZERO signal over the line 76 to the microprocessor 74. Then the microprocessor will call off the transducer initialization command.

Then the microprocessor 74 will reset a track address counter, not shown, which is conventionally built into it. The track address counter produces a signal indicative of the radial position of the transducer 18 on the disk 10 with respect to Track $T_0$.

With the transducer 18 initialized on Track $T_0$ through the foregoing procedure, the microprocessor 74 can now execute a track seek routine with the aid of the track address code prerecorded on the disk 10. However, before discussion of the track seek routine, I will briefly explain how the prerecorded track address code enables the positioning of the transducer on any of a multiplicity of data tracks on the disk.

Let us first assume that, traveling radially inwardly of the revolving disk 10, the transducer 18 reads all the address code characters assigned to the individual tracks T, from outmost Track $T_0$ to inmost Track $T_n$, and that all these address code characters are fed into the microprocessor 74. In that case the microprocessor will obtain the noted CONVERTED TRACK CODE signal, which, as represented in FIG. 8, varies periodically to represent the decimal equivalents 0–15 of the address code characters assigned to the successive track groups.

Figure 8:
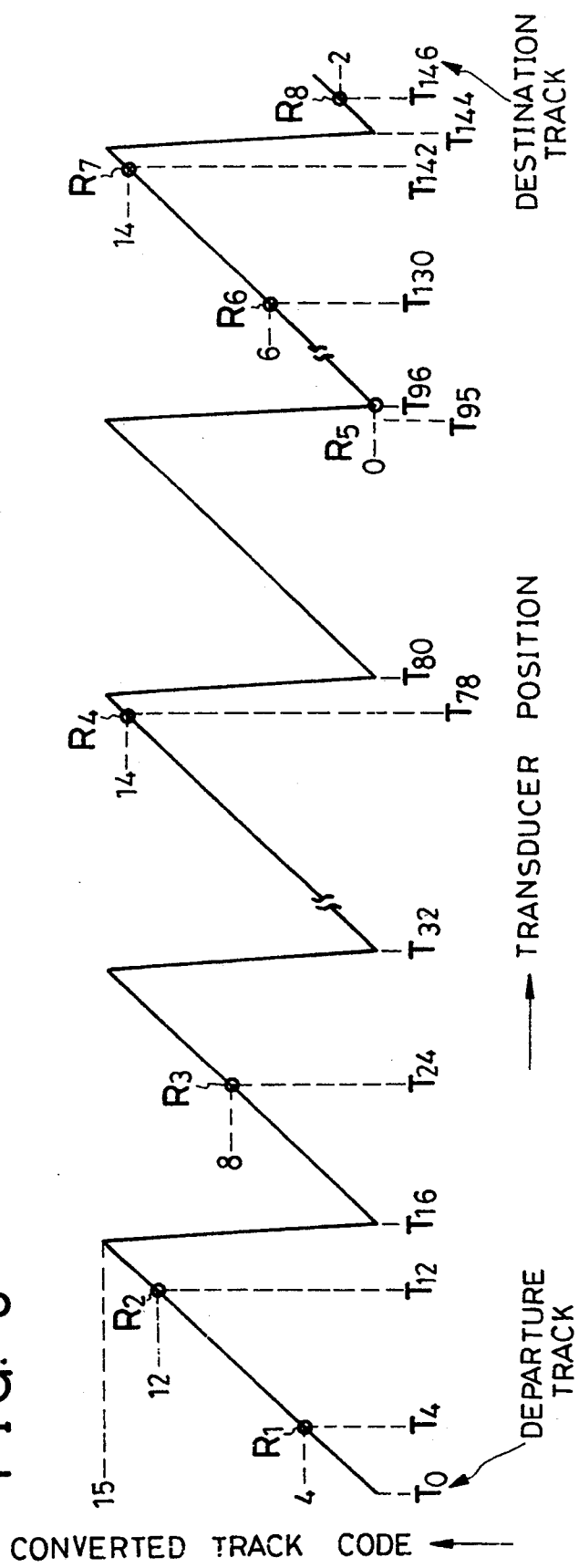
FIG. 8 is explanatory of how the transducer travels from departure track to destination track and is positioned on the latter on the basis of the decimal equivalents of track address samples in the FIG. 1 system.

Actually, however, the transducer 18 will trace a slanting path across each servo sector of the disk during seek operations, as indicated at 120 in FIG. 8. Further the servo sectors are interleaved with the data sectors on the disk. It may therefore be difficult for the transducer to read the address code characters on all the tracks. Nor is it necessary for the transducer to read all the address code characters on the tracks intervening between departure track and destination track.

Basically, all that is required is that the microprocessor be supplied with at least one, preferably two, samples of the track address code as the transducer traverses each group of sixteen tracks. The maximum allowable traveling speed of the transducer in that case need not be inconveniently low because the disk has as many as sixteen servo sectors at constant angular spacing. Supplied with at least one address code sample from each group of tracks, the microprocessor 74 can discern the travel of the transducer from one track group to the next and, therefore, the total number of track groups that have been traversed by the transducer. The transducer can be positioned on any track if the microprocessor knows the address code character of the destination track and the number of track groups that have been traversed.

However, I have later discovered that it is even unnecessary that the microprocessor be supplied with one address code sample: from each track group. The maximum allowable traveling speed of the transducer can then be made higher. The following description will make clear how the transducer can be moved at such high seek speed.

FIG. 8 is explanatory of a typical track seeking operation according to the principles of my present invention. The transducer travels from departure track $T_0$ to destination track $T_{146}$, it being understood that these track numbers are by way of example only.

The seek operation starts as the microprocessor 74 inputs by way of the line 86, FIG. 1, the TRACK COMMAND specifying Track $T_{146}$ as the destination track. The TRACK COMMAND does not specify the destination track in terms of the address code but, as is conventional in the art, in terms of one of the consecutive track numbers preassigned to all the tracks on the disk. The microprocessor 74 must then know the current position of the transducer 18. Since we have assumed that the current transducer position is Track $T_0$, the microprocessor computes the difference between the track numbers of the departure track and the destination track; namely, $146-0=146$. The transducer must travel one hundred and forty-six tracks to the requested destination track.

The microprocessor 74 proceeds to prepare the SEEK DATA for controlling the traveling speed of the transducer in accordance with the SEEK SPEED CONTROL curve X of FIG. 6, and the SEEK DIRECTION signal which indicates, in this instance, the radially inward direction of the disk 10. The SEEK DATA in this particular case is so determined as to suit the required travel of the transducer over one hundred and forty-six tracks. Inputting the analog equivalent of the SEEK DATA from the DAC 102, the motor control circuit 104 will cause energization of the voice coil motor 24 with current values necessary for moving the transducer as dictated by the SEEK DATA.

During such track seek travel of the transducer 18, the speed sensor 106 will feed back to the motor control circuit 104 the TRANSDUCER SPEED signal representative of the actual traveling speed of the transducer. The motor control circuit 104 will refer the TRANSDUCER SPEED signal to the SEEK DATA and control the traveling speed of the transducer along the SEEK SPEED CONTROL curve X of FIG. 6. The actual traveling speed of the transducer will closely approximate the SEEK SPEED CONTROL curve X, as indicated by the broken-line curve Y in FIG. 6.

Figure 7:
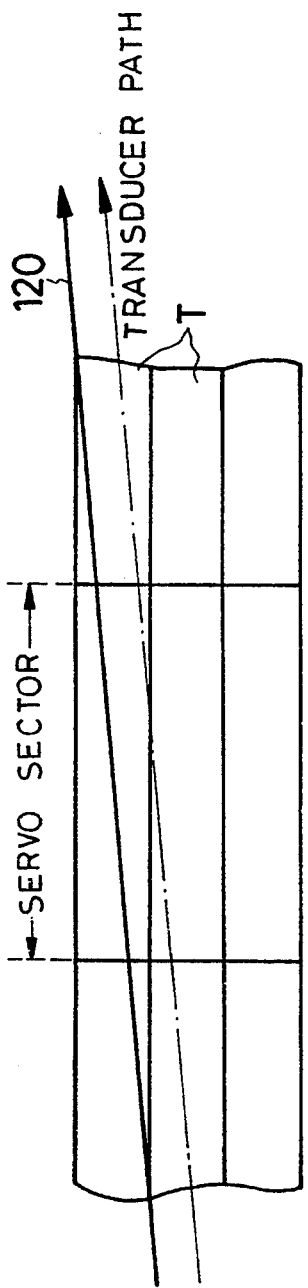
FIG. 7 is a fragmentary illustration of the spiral path traced by the transducer on the rotating magnetic disk during track seeking operation in the FIG. 1 system.

Since the disk 10 is in constant speed rotation during the track seek operation, the transducer 18 will trace a spiral path on the disk, as depicted fragmentarily and designated 120 in FIG. 7. The microprocessor 74 will periodically sample the track address code (outputs from the flag detector circuit 58 and code detector circuit 60) at intervals determined by the SECTOR PULSES incoming from the sector pulse generator 64 over the line 84. FIG. 8 indicates, purely by way of example, that the microprocessor 74 has so sampled the track address code at $R_1$–$R_8$ during transducer travel from departure track $T_0$ to destination track $T_{146}$. The sample address code characters obtained are shown to be those from Tracks $T_4$, $T_{12}$, $T_{24}$, $T_{78}$, $T_{96}$, $T_{130}$, $T_{142}$ and $T_{146}$.

As will be seen by referring back to FIG. 3, the address code character on Track $T_4$ is composed of the magnetized regions 36–44. As the transducer 18 reads this address code character, the corresponding flag of FIG. 4(D) and the corresponding code detector output of FIG. 4(E) will be fed into the microprocessor 74 over the lines 78 and 80 of FIG. 1. Identifying Track $T_4$ from these input signals, the microprocessor 74 will compute the remaining number of tracks that must be traversed; namely, $146-4=142$. Then the microprocessor will renew the SEEK DATA based upon the remaining number of tracks. The microprocessor will renew the SEEK DATA each time it takes in a new track address sample thereafter, as on Tracks $T_{12}$, $T_{24}$, $T_{78}$, $T_{96}$, $T_{130}$ and $T_{142}$. Thus the transducer will travel toward the destination track at the optimum speed at every moment.

Figure 9:
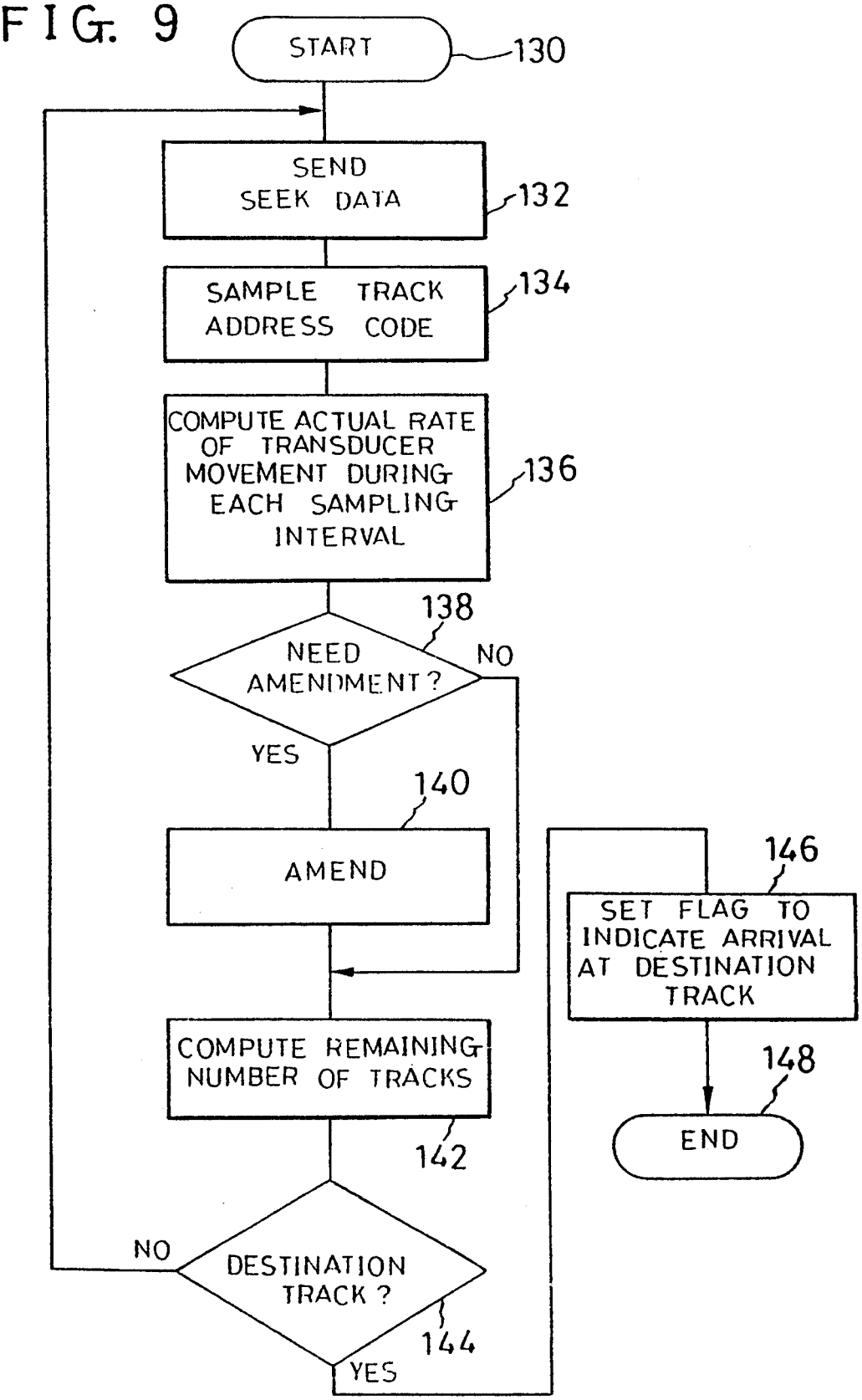
FIG. 9 is a flowchart of a seek routine programmed on the digital system controller microprocessor of the FIG. 1 system.

For the most efficient, speedy accomplishment of seek operation, I suggest that the ROM built into the microprocessor 74 be preprogrammed in accordance with the flowchart of FIG. 9. The seek routine starts at 130 in response to the TRACK COMMAND from the host computer. At a block 132 the microprocessor sends the SEEK DATA to the DAC 102 in response to a SECTOR PULSE fed from the sector pulse generator 64 over the line 84. The transducer 18 will then start traveling toward the destination track commanded by the host computer.

The next block 134 indicates the periodic sampling, by the microprocessor 74, of the track address code being read by the transducer 18 from the successive data tracks being traversed. The sampling interval is equal to one sector interval in this embodiment. One sector interval is the time required for disk rotation through one servo sector angle and, typically, is 620 microseconds.

The next block 136 involves the computation of the ACTUAL RATE OF TRANSDUCER MOVEMENT, that is the number of tracks actually traversed by the transducer per unit time. The unit time is one sampling interval in this embodiment. Accordingly, the microprocessor can compute the ACTUAL RATE OF TRANSDUCER MOVEMENT simply in terms of the difference between the CONVERTED TRACK CODE values (i.e. decimal equivalents) of the n'th (current) and (n−1)'th (previous) track address samplings.

Let us assume that the CONVERTED TRACK CODE values of Tracks $T_4$, $T_{12}$ and $T_{24}$, the first three tracks at which the address code is supposed to have been sampled by the microprocessor, are four, twelve and eight, respectively. The ACTUAL RATE OF TRANSDUCER MOVEMENT is computed as (4−0=4) at Track $T_4$, and (12−4=8) at Track $T_{12}$. At Track $T_{24}$, however, a similar computation, (8−12=−4), results in a negative value, which means that the transducer has traveled to the next group of tracks. In that case, therefore, the CONVERTED TRACK CODE value of the (n−1)'th track address sampling is subtracted from the number (sixteen in this embodiment) of tracks of each group, and the difference is added to the CONVERTED TRACK CODE value of the n'th track address sampling; namely, (16−12)+8=12.

It is understood that the transducer is accelerated from Track $T_0$ to Track $T_{24}$ in FIG. 8, in accordance with the linear acceleration period $X_1$ of the SEEK SPEED CONTROL curve X of FIG. 6. This fact is evidenced by the fact that the ACTUAL RATE OF TRANSDUCER MOVEMENT increases from four to eight and then to twelve as the transducer travels over Tracks $T_4$, $T_{12}$ and $T_{24}$, as above, despite the fact that the address code is sampled at regular intervals. However, the ACTUAL RATE OF TRANSDUCER MOVEMENT increments constantly at these tracks, since 8−4=4 and 12−8=4. Such a constant change in the ACTUAL RATE OF TRANSDUCER MOVEMENT makes it possible for the microprocessor to expect a rate of transducer movement from the n'th (current) to the (n+1)'th (next) track address sampling.

Thus, at the logical node 138, the microprocessor 74 refers the ACTUAL RATE OF TRANSDUCER MOVEMENT to the EXPECTED RATE OF TRANSDUCER MOVEMENT. The ACTUAL RATE OF TRANSDUCER MOVEMENT need not be amended up to the third address code sampling $R_3$ because the transducer has traversed no one complete track group during each sampling interval. The ACTUAL RATE OF TRANSDUCER MOVEMENT is amended if the absolute value of the difference between the ACTUAL and EXPECTED RATES OF TRANSDUCER MOVEMENT exceeds a predetermined value. Normally, this predetermined value is in the range of 40 to 80 percent of the maximum possible rate of transducer movement during each sampling interval. The maximum possible rate of transducer movement is eighteen in this particular embodiment, by which I mean that the transducer traverses a maximum of eighteen tracks during each sampling interval. Therefore, normally, the noted predetermined value is from seven to fourteen, preferably nine.

The EXPECTED RATE OF TRANSDUCER MOVEMENT may be determined in several ways. I recommend that it be determined from the transducer speed ascertained at the (n−1)'th (previous) address code sampling and the sampling interval. Since the sampling interval is constant, the EXPECTED RATE OF TRANSDUCER MOVEMENT can be readily computed from the transducer speed information in terms of the number of data tracks to be traversed.

Let $R_1$ be the (n−1)'th sampling, and $R_2$ the n'th (current) sampling. Let us also assume that the EXPECTED RATE OF TRANSDUCER MOVEMENT from $R_1$ to $R_2$ is eight. Then the absolute value of the difference between the ACTUAL and EXPECTED RATES OF TRANSDUCER MOVEMENT is zero since the ACTUAL RATE OF TRANSDUCER MOVEMENT from $R_1$ to $R_2$ is also eight. The ACTUAL RATE OF TRANSDUCER MOVEMENT need not be amended, so that the answer to the node 138 is no.

The next block 140 is bypassed if the answer is no, and the remaining number of tracks to be traversed to the destination track is computed at the following block 142. The transducer has traversed twelve tracks at the second address code sampling $R_2$. The remaining number of tracks to Track $T_{146}$ is therefore one hundred and thirty-four (146−12=134).

Then, at the logical node 144, it is determined if the transducer has arrived at the destination track $T_{146}$. If not, the seek routine is restarted at the block 132. If the answer is yes, on the other hand, then a flag is set at the block 146 to indicate arrival at the destination track, and the seek routine ends at the block 148.

The ACTUAL RATE OF TRANSDUCER MOVEMENT must be amended at the block 140 if the answer to the logical node 138 is yes. I will now explain this case.

The transducer is traveling at the maximum speed along the constant speed period $X_2$ of the SEEK SPEED CONTROL curve X of FIG. 6 from the third $R_3$ to the fifth $R_5$ address code sampling in FIG. 8. As has been mentioned, the maximum traveling speed of the transducer is so determined in this embodiment that the transducer traverses approximately eighteen tracks during each sampling interval. The transducer may therefore skip over one complete group of tracks during one sampling interval. In the case illustrated in FIG. 8, the microprocessor takes in no address code sample as the transducer travels over the group of Tracks $T_{80}$–$T_{95}$ during part of the time interval from the fourth $R_4$ (Track $T_{78}$) to the fifth $R_5$ (Track $T_{96}$) sampling.

The EXPECTED RATE OF TRANSDUCER MOVEMENT is eighteen from the fourth $R_4$ to the fifth $R_5$ sampling because then the transducer is traveling at the maximum speed. The ACTUAL RATE OF TRANSDUCER MOVEMENT during the same time interval, on the other hand, is computed from the CONVERTED TRACK CODE values of fourteen and zero at the fourth $R_4$ and fifth $R_5$ samplings, as: $(16-14)+0=2$. The absolute value of the difference between the EXPECTED and ACTUAL RATES OF TRANSDUCER MOVEMENT is therefore sixteen. This value is greater than the predetermined value of nine. The answer to the logical node 74 is therefore yes, meaning that the ACTUAL RATE OF TRANSDUCER MOVEMENT needs amendment.

Such amendment is effected at the block 140. First, the number of tracks of each group is added to the ACTUAL RATE OF TRANSDUCER MOVEMENT at the sampling $R_5$; namely, $2+16=18$. Then the sum is added to the total number of tracks that have been traversed until the fourth sampling $R_4$, that is, seventy-eight. Therefore, $18+78=96$. We have thus found the track number read at the fourth sampling $R_4$ and so can proceed to the block 142 which has been explained already.

The transducer is decelerating, being in the linear deceleration period $X_3$ of the SEEK SPEED CONTROL curve X, when the address code of Tracks $T_{130}$, $T_{142}$ and $T_{146}$ is sampled at $R_6$, $R_7$ and $R_8$, respectively, as in FIG. 8. The ACTUAL RATE OF TRANSDUCER MOVEMENT decrements during this time. However, the transducer decelerates so linearly that the EXPECTED RATE OF TRANSDUCER MOVEMENT can be computed just as accurately as in the linear acceleration period $X_1$.

I have so far described the track seeking operation of the FIG. 1 system on the assumption that no errors have been in the track address code readings or in the SECTOR PULSES. In the absence of such errors, the transducer will be accurately and speedily positioned on the destination track through the foregoing seek routine programmed on the microprocessor 74. However, the seek operation must be discontinued as taught by my invention if such errors do take place a preselected number of times; otherwise, the transducer 18 would overrun the data storage zone 26 on the disk surface. Although the transducer would then come to rest in either of the extreme positions 112 and 114 on the guard bands 23 and 30 on the disk surface, such transducer overrun is nevertheless undesirable because the transducer carrier beam 20 would violently hit either of the limit stops 108 and 110, possibly with the consequent damage to either or both of the transducer and the disk surface.

Reference is now directed to FIG. 5 for a study of how the microprocessor 74 terminates track seeking upon detection of the noted errors. The error detector circuit 98 of the microprocessor 74 finds possible errors in track address code readings from the TRACK DATA put out by the track data generator 90. As has been mentioned, the TRACK DATA represents the data track on the disk surface on which the transducer 18 is currently positioned. If the actual track indicated by the TRACK DATA differs a predetermined degree from an expected track on which the transducer is supposed to be positioned at the moment, the error detector circuit 98 regards the fact as an error in track address code reading.

Also, the error detector circuit 98 examines the SECTOR PULSES being sent from the sector pulse generator 64 over the line 84 to see if they are incoming at prescribed time intervals. If not, the error detector circuit 98 takes the fact as an error.

The error counter 100 counts such errors during each track seek operation. When the errors occur a predetermined number of times (e.g. three), the error counter 100 causes the seek data generator 92 to discontinue the seek operation.

Second Form

I have proposed in the foregoing embodiment to discontinue the track seeking operation upon detection of the imminent danger of transducer overrun beyond the boundaries of the data storage zone on the disk surface. Alternatively, however, the transducer may be stopped immediately after it has actually overrun the data storage zone. This alternate method is embodied in the second form of hard disk data storage and retrieval system shown in FIG. 10.

Figure 10:
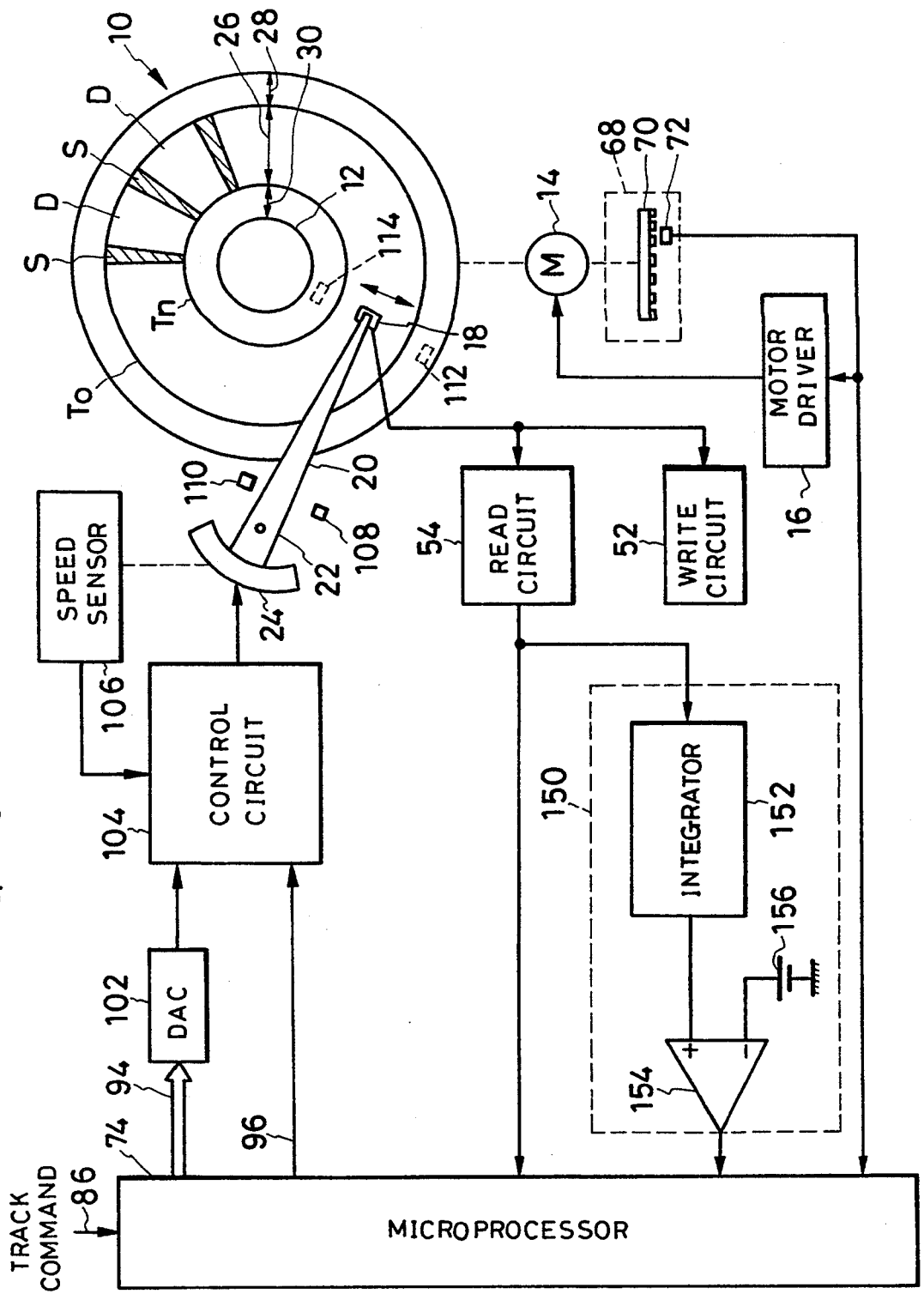
FIG. 10 is a diagram similar to FIG. 1 but showing another preferred embodiment of my invention.

The FIG. 10 system features an overrun detector circuit 150 for detecting the overrun of the transducer onto either of the outer and inner guard bands 28 and 30. The overrun detector circuit 150 comprises an integrator 152 connected to the output of the read circuit 54, and a voltage comparator 154 having its two inputs connected to the integrator 152 and a source 156 of a reference voltage. The output of the voltage comparator 154 is connected to the microprocessor 74 for sending thereto an OVERRUN signal to be defined subsequently.

The FIG. 10 system can be analogous in the other details of construction with the FIG. 1 system, although I have not shown the various other circuits connected between read circuit 54 and microprocessor 74 as they are not essential for an understanding of the operating principles of this alternate system. The microprocessor 74 can also be of substantially the same make as that of the FIG. 1 system except that it must input the OVERRUN signal from the overrun detector circuit 150 and decide to continue or discontinue the track seeking operation accordingly.

Operation of Second Form

The read circuit 54 produces some form of read data as long as the transducer 18 stays on the data storage zone 26 on the surface of the magnetic disk 10 during the progress of track seeking. Consequently, the output voltage of the integrator 152 differs distinctly depending upon whether the transducer 18 is on the data storage zone 26 or on either of the outer and inner guard bands 28 and 30. The comparator 154 compares this integrator output voltage with the reference voltage from its source 156. The resulting OVERRUN signal indicates that the transducer is on the data storage zone 26 when the integrator output voltage is higher than the reference voltage, and on either of the guard bands 28 and 30, having overrun the data storage zone, when the integrator output voltage is less than the reference voltage.

Inputting the OVERRUN signal, the microprocessor 74 may terminate the track seeking operation immediately when the OVERRUN signal indicates transducer overrun. The transducer will come to rest before the transducer carrier beam 20 hits either of the limit stops 108 and 110.

It should be appreciated that in this alternate embodiment, too, the objective of preventing transducer overrun too far beyond the boundaries of the data storage zone on the disk surface is accomplished only by slight modification of the existing electronic hardware. No sensors or the like are required for overrun detection.

Third Form

Figure 11:
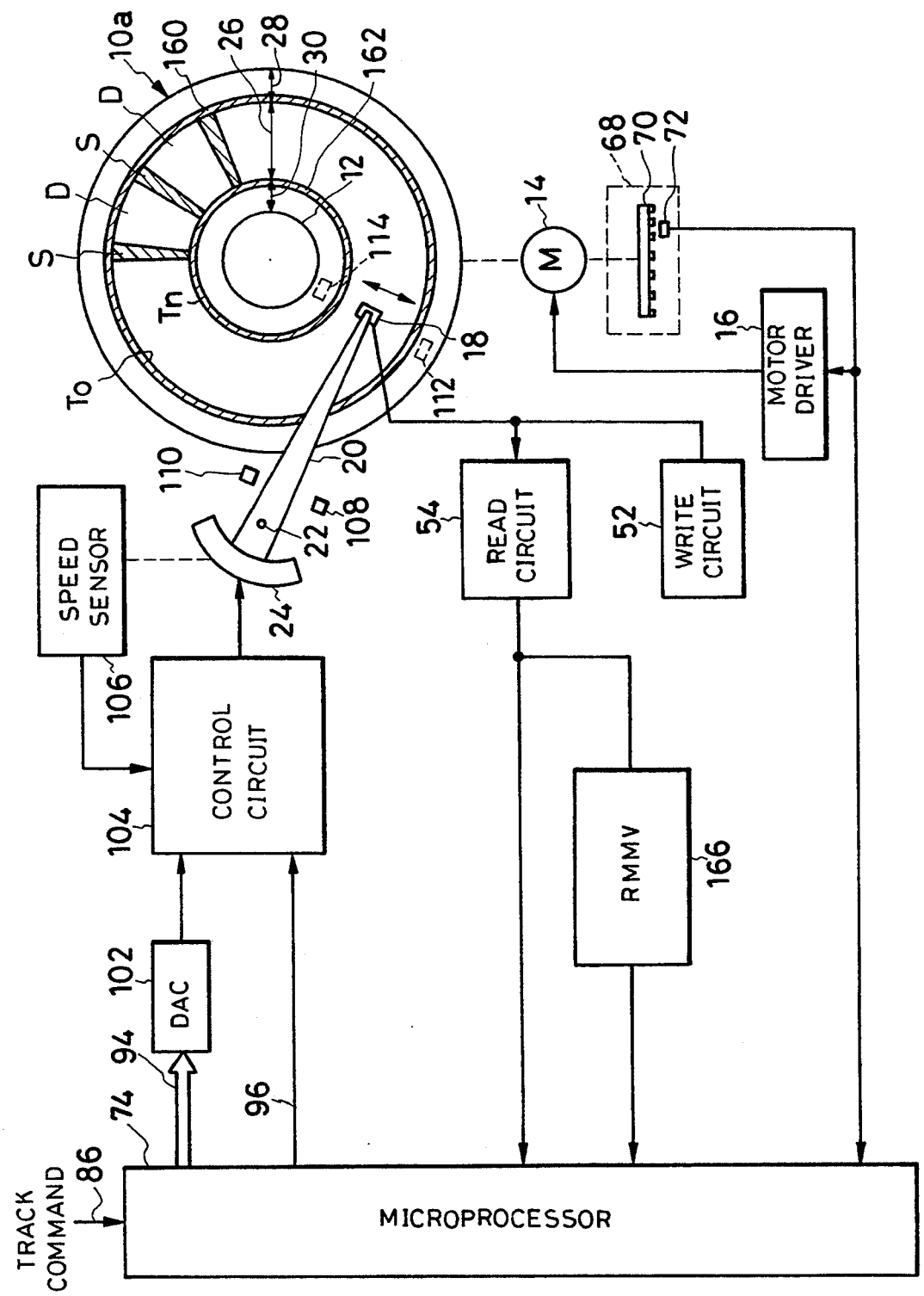
FIG. 11 is a diagram also similar to FIG. 1 but showing still another preferred embodiment of my invention.

The third form of hard disk data storage and retrieval system shown in FIG. 11 employs a magnetic disk 10a having an annular outer boundary band 160 and an annular inner boundary band 162 demarcating the opposite boundaries of the data storage zone 26. The outer boundary band 160 lies between outmost Track $T_0$ and outer guard band 28. The inner boundary band 162 lies between inmost Track $T_n$ and inner guard band 30.

Figure 12:
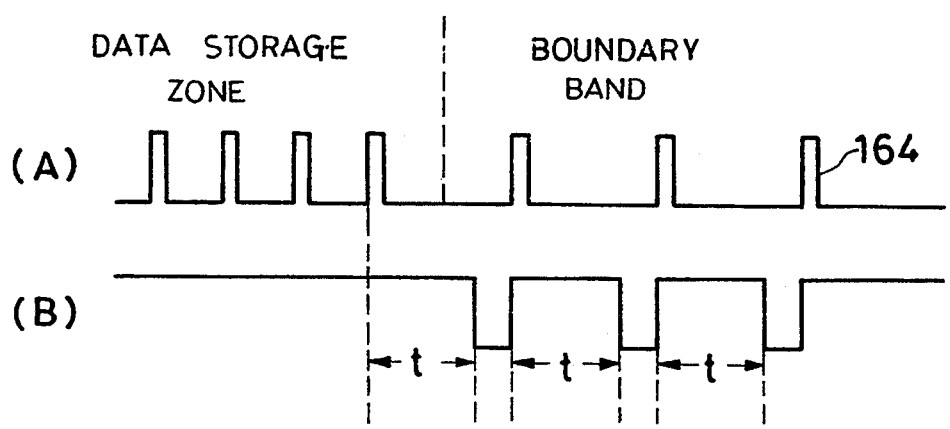
FIG. 12, consisting of (A) and (B), is a combined timing and waveform diagram explanatory of the operation of the FIG. 11 system.

As illustrated at (A) in FIG. 12, each of the outer and inner boundary bands 160 and 162 has a boundary signal 164 prerecorded thereon. The frequency of the boundary signal 164 is not more than one half of the lowest frequency of the signal written on the data storage zone 26.

The FIG. 11 system employs an overrun detector circuit in the form of a simple retriggerable monostable multivibrator (RMMV) 166 connected between read circuit 54 and microprocessor 74. The other details of construction can be substantially as set forth above in connection with the foregoing embodiments.

Operation of Third Form

Triggered by the read pulses from the read circuit 54, the RMMV 166 puts out pulses having a duration t, FIG. 12(B), greater than the maximum period of the data recorded on the data storage zone 26. Therefore, as indicated also in FIG. 12(B), the output from the RMMV 166 remains high as long as the transducer 18 stays on the data storage zone 26 during track seeking. The RMMV output starts production of discrete pulses when the transducer overruns the data storage zone 26 and rides onto either of the boundary bands 160 and 162, because then the period of the trigger pulses becomes longer than the output pulse duration t of the RMMV 166.

Accordingly, when the overrun signal from the RMMV 166 becomes discontinuous as in FIG. 12(B), the microprocessor 27 can know that the transducer 18 has just overrun the data storage zone 26 and ridden onto either of the boundary zones 160 and 162. The microprocessor 27 may then discontinue the seek operation immediately. Thus, in this third embodiment, too, the noted objectives of invention are accomplished without use of sensors or the like for transducer overrun detection.

Possible Modifications

Although I have shown and described my invention in terms of but a few preferable embodiments thereof, I do not wish my invention to be limited by the exact details of the foregoing disclosure. The following, then, is a brief list of possible modifications, alterations and adaptations of the illustrated embodiments that I believe all fall within the scope of my invention:

1. The track seeking operation could be discontinued in the FIG. 1 system upon detection of a prescribed number of errors in only either of track address code readings and sector pulses.

2. Some or all of the track data generator 90, error detector 98 and error counter 100 could be provided external to the microprocessor 74.

3. Track addresses could be recorded serially on all the data tracks on the disk surface, instead of assigning the same set of address code to plural groups of data tracks as in the first disclosed embodiment of my invention.

4. The track address code could be recorded on the identification fields of the data sectors instead of on the servo sectors.

5. The teachings of the FIGS. 1–9 embodiment may be combined with those of either of the FIGS. 10 and 11 embodiments.

What I claim is:

1. In a data storage apparatus including a transducer for data transfer with a rotating data storage disk having an annular data storage zone comprised of a multiplicity of concentric data tracks on at least one of the opposite major surfaces of the disk, the data tracks having track addresses prerecorded thereon, the transducer reading the track addresses on the data tracks being traversed during each track seeking operation, and a read circuit for providing an output representative of data read from the data storage disk by the transducer, a transducer position control system comprising:

(a) positioning means connected to the transducer for moving the transducer across the data tracks on the data storage disk and for positioning the transducer over any selected one of the data tracks;

(b) sampling means connected to the read circuit for sampling at regular intervals the track addresses being read by the transducer during a track seeking operation;

(c) control circuit means connected to both the positioning means and the sampling means for controlling the movement of the transducer with respect to the data storage disk on the basis of the track address samples obtained; and (d) error detector circuit means connected between the sampling means and the control circuit means for detecting errors in the track address samples being sent to the control circuit means, said error detector circuit means having an error counter to count said errors so as to cause the control circuit means to discontinue the track seeking operation when a prescribed number of errors is found in the track address samples during each track seeking operation.

2. In a data storage apparatus including a transducer for data transfer with a rotating data storage disk having a major surface on which a plurality of servo sectors and a plurality of data sectors are interleaved, with a multiplicity of concentric annular data tracks extending through the servo sectors and the data sectors, the data tracks having track addresses prerecorded thereon, the transducer reading the track addresses on the successive data tracks being traversed during each track seeking operation, and a read circuit for providing an output representative of data read from the data storage disk by the transducer, a transducer position control system comprising:

(a) positioning means connected to the transducer for moving the transducer across the data tracks on the data storage disk and for positioning the transducer over any selected one of the data tracks;

(b) sector pulse generator means connected to the read circuit for deriving form the output form the read circuit a series of sector pulses indicative of the transducer positioned over one of the servo sectors on the data storage disk;

(c) sampling means connected to both the read circuit and the sector pulse generator means for sampling the track addresses being read by the transducer during a track seeking operation, at time intervals determined by the sector pulses;

(d) control circuit means connected to both the positioning means and the sampling means for controlling the movement of the transducer with respect to the data storage disk on the basis of the track address samples obtained; and (d) error detector circuit means connected to both the sampling means and the sector pulse generator means for detecting errors both in the track address samples being sent to the control circuit means and in the sector pulses so as to cause the control circuit means to discontinue the track seeking operation when a prescribed number of errors is found during each track seeking operation.

3. In a data storage apparatus having a transducer to be selectively positioned on any of a multiplicity of concentric annular data tracks on at least one major surface of a rotating data storage disk, the data tracks being divided into a plurality of groups, each data track having a different track address code character prerecorded thereon,d all the groups of tracks having the same set of track address code characters assigned thereto for the simplicity of the track address code, the transducer reading the track addresses on the successive data tracks being traversed during each track seeking operation, and a read circuit for providing an output representative of data read from the data storage disk by the transducer, a transducer position control system comprising:

(a) positioning means connected to the transducer for moving the transducer across the data tracks on the data storage disk and for positioning the transducer over any selected one of the data tracks;

(b) sampling means connected to the read circuit for sampling at regular intervals the track addresses being read by the transducer during a track seeking operation;

(c) control circuit means connected to both the positioning means and the sampling means for controlling the movement of the transducer with respect to the data tracks on d the data storage disk on the basis of the successive sample track address code characters fed from the sampling means;

(d) error detector circuit means connected between the sampling means and the control circuit means for detecting errors in the track address samples being sent to the control circuit means, said error detector circuit means having an error counter to count said errors so as to cause the control circuit means to discontinue the track seeking operation when a prescribed number of errors is found in the track address samples during each track seeking operation.

4. A method of controlling a transducer for data transfer over a rotating data storage disk having an annular data storage zone comprised of a multiplicity of concentric data tracks on at least one of the opposite major surfaces of the disk, the data tracks having track addresses prerecorded thereon, the transducer reading the track addresses on the successive data tracks being traversed during each track seeking operation, and a read circuit for providing an output representative of data read from the data storage disk by the transducer, comprising the steps of:

(a) sampling at regular intervals the track addresses being read by the transducer during a track seeking operation in order to determine the data track on which the transducer is currently positioned and the remaining number of tracks to be traversed until the transducer arrives at a destination track;

(b) monitoring the track address samples for detecting possible errors therein; and (c) discontinuing the track seeking operation immediately when a prescribed number of errors is found in the track address samples during each track seeking operation so as to prevent or stop the transducer from overrunning the annular data storage zone.

5. A method of controlling a transducer for data transfer over a rotating data storage disk having an annular data storage zone on which a plurality of servo sectors and a plurality of data sectors are interleaved, with a multiplicity of concentric annular data tracks extending through the servo sectors and the data sectors, the data tracks having track addresses prerecorded thereon, the transducer reading the track addresses on the successive data tracks being traversed during each track seeking operation, and a read circuit for providing an output representative of data read from the data storage disk by the transducer, comprising the steps of:

(a) deriving from the output from the read circuit a series of sector pulses representative of the servo sectors on the data storage disk during track seeking operation;

(b) sampling the track addresses being read by the transducer during a track seeking operation, at time intervals determined by the sector pulses, in order to determine the data track on which the transducer is currently positioned and the remaining number of tracks to be traversed until the transducer arrives at a destination track;

(c) monitoring the track address samples for possible errors;

(d) monitoring the sector pulses for possible errors; and (e) discontinuing the track seeking operation immediately when a prescribed number of errors is found in the track address samples and the sector pulses during each track seeking operation so as to prevent or stop the transducer from overrunning the annular data storage zone.

6. The transducer position control system according to claim 1 wherein moving the transducer across the data tracks towards said selected one of the data tracks defines a transducer movement.

7. The transducer position controls system according to claim 6 wherein said error detector circuit means calculates an actual and estimated rates of the transducer movement towards said selected data track based upon said track addresses sampled by said sampling means.

8. The transducer position control system according to claim 6 wherein said error detector circuit means determines said errors based upon a discrepancy between said actual rate of the transducer movement and said estimated rate of the transducer movement.

9. The transducer position control system according to claim 1 wherein said error detector circuit means determines said errors based upon a discrepancy between said track address of said selected one of the data tracks and said track address samples when the transducer is positioned over said selected one of the data tracks.

10. The transducer position control system according to claim 1 wherein said error detector circuit means determines said errors based upon sector pulses.

11. A transducer position control system for storing and retrieving data to and form a data storage disk via a transducer, the data storage disk having data tracks, each data track having a unique prerecorded track address, the transducer position control system comprising:

(a) positioning means connected to the transducer for positioning the transducer to a desired track in response to a seek operation;

b) sampling means connected to the transducer for periodically sampling a set of the track addresses as the transducer travels towards said desired track, a rate of such travel defining a rate of the transducer movement;

(c) control means connected to both said positioning means and said sampling means for controlling said positioning means based upon said track addresses sampled by said sampling means; and (d) error determining means connected between said sampling means and said control means for calculating an actual rate of the transducer movement based upon currently and previously sampled sets of said track addresses sampled by said sampling means, said error determining means also calculating an expected rate of the transducer movement based upon the previously sampled set of said track addresses, thereby said error determining means determining an error based upon a discrepancy between said actual rate of the transducer movement and said expected rate of the transducer movement, said error determining means having an error counter for counting a number of said errors during said peak operation, said error determining means sending a signal indicative of terminating the transducer movement to said control means when a predetermined number of said errors is counted in said error counter.

* * * * *